United States Patent [19]

Sakurada

[11] Patent Number: 4,898,325
[45] Date of Patent: Feb. 6, 1990

[54] AUTOMOBILE AIR CONDITIONER WITH SEPARATE FLOW ADJUSTMENT FOR CENTRAL AND SIDE VENTS

[75] Inventor: Muneo Sakurada, Saitama, Japan
[73] Assignee: Diesel Kiki Co., Ltd., Tokyo, Japan
[21] Appl. No.: 168,278
[22] Filed: Mar. 15, 1988
[30] Foreign Application Priority Data
  Apr. 28, 1987 [JP] Japan .................. 62-105658
[51] Int. Cl.$^4$ .......... B60H 1/02; B60H 1/34
[52] U.S. Cl. .......... 237/12.3 B; 237/12.3 A; 165/42; 165/43; 165/22; 98/2; 98/2.01; 98/2.11
[58] Field of Search ........... 165/16, 22, 42, 43; 98/2, 2.01, 2.11; 237/2 A, 12.3 A, 12.3 B

[56] References Cited

U.S. PATENT DOCUMENTS 4,478,274 10/1984 Naganoma .................. 165/42

FOREIGN PATENT DOCUMENTS

| 52-19300 | 2/1977 | Japan . | |
|---|---|---|---|
| 0151410 | 9/1982 | Japan | 98/2 |
| 0015219 | 1/1985 | Japan | 98/2 |
| 0282115 | 12/1986 | Japan | 98/2.11 |
| 0295125 | 12/1986 | Japan | 98/2.11 |

Primary Examiner—John Ford
Attorney, Agent, or Firm—Charles S. McGuire

[57] ABSTRACT

An air conditioning system for an automotive vehicle has a central air outlet, and a pair of left and right air outlets arranged at left and right sides of said central air outlet, which are provided at least one of front and rear portions of the vehicle compartment. A center vent passage extends from a first diverging point and leads to the central air outlet. A side vent passage extends from the first diverging point in a manner separated from the center vent passage and leads to the left and right air outlets. The side vent passage has a pair of left-hand and right-hand vent passages extending from a second diverging point located at a different position from the first diverging point and leading to the left and right outlets, respectively. A flow rate ratio-adjusting door is arranged at the second diverging poing for adjusting the ratio between the flow rates of air delivered into the left-hand and right-hand vent passages.

1 Claim, 6 Drawing Sheets

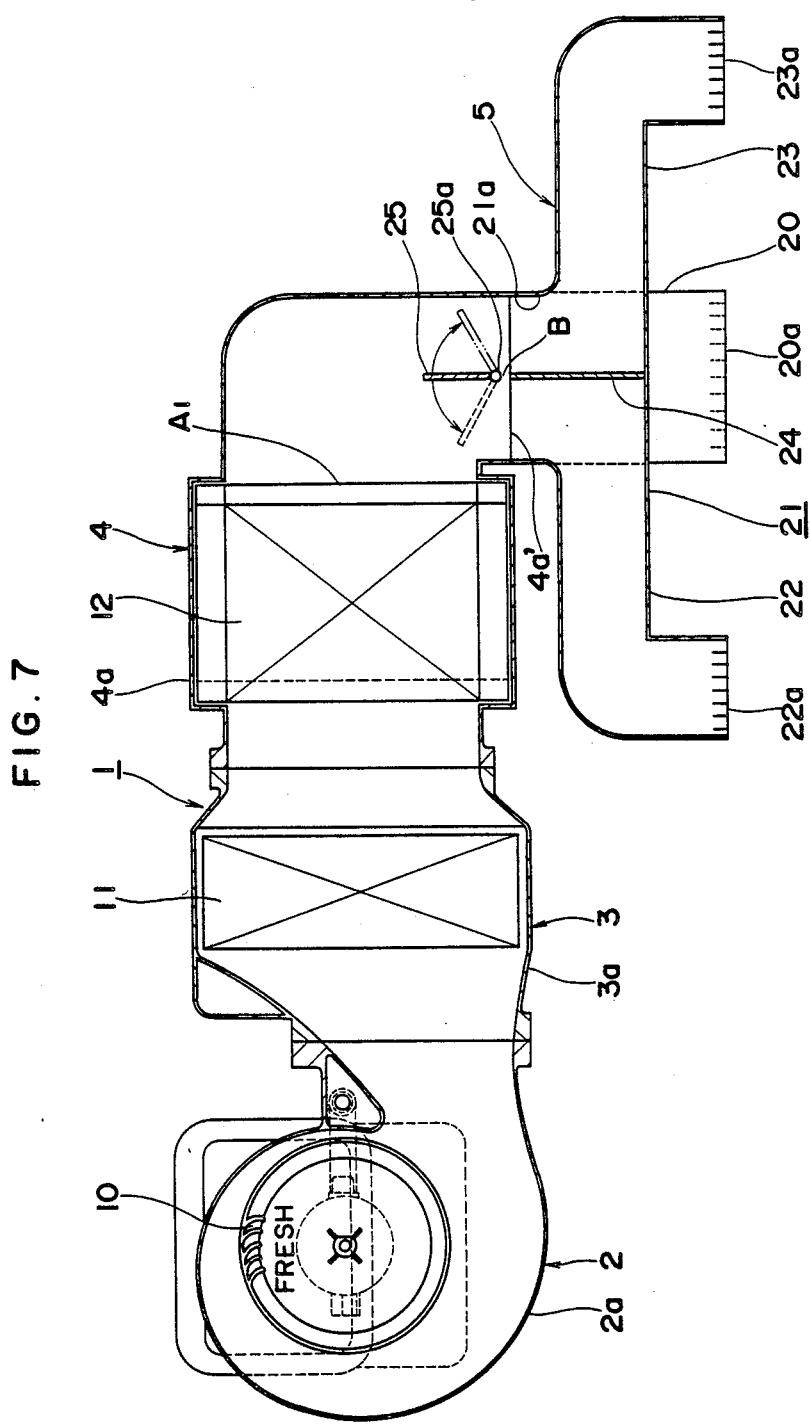

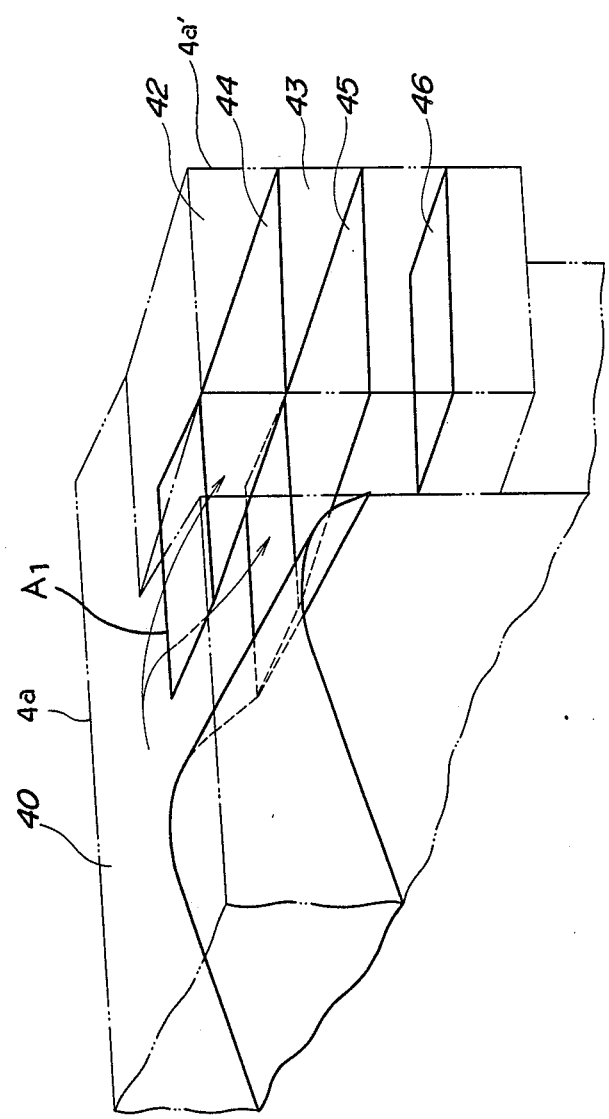

AUTOMOBILE AIR CONDITIONER WITH SEPARATE FLOW ADJUSTMENT FOR CENTRAL AND SIDE VENTS

BACKGROUND OF THE INVENTION

This invention relates to an air conditioning system for automotive vehicles, and more particularly to an air condition system of this kind which is capable of adjusting the ratio between air amounts blown through left and right air outlets.

An air conditioning system of this kind is known e.g. from Japanese Utility Model Publication (Kokoku) No. 52-19300, which comprises a pair of left and right air outlets arranged, respectively, at left and right sides of a front wall of a compartment of an automotive vehicle, and a pair of temperature sensors arranged at the left and right sides of the front wall, and a door arranged at a juncture or diverging point from which two passages extend to the respective left and right air outlets, for adjusting the ratio between the flow rates of air blown through the respective air outlets. The door is controlled in response to output from the temperature sensors indicative of temperature values detected at the left and right sides to adjust the ratio between the flow rates of air blown through the left and right air outlets.

On the other hand, in conventional air conditioning systems for automotive vehicles having a central air outlet and left and right air outlets in general, the central air outlet is located at the center of a vent duct and the left and right air outlets are located, respectively, at left and right ends of the vent duct.

However, if the aforementioned arrangement known from Japanese Utility Model Publication (Kokoku) No. 52-19300 is applied to such conventional air conditioning systems for automotive vehicles, the door for adjusting the air flow rate ratio will be arranged at a central portion of the vent duct from which branch the passages leading to the left and right air outlets. As a result, as the door is pivotally moved, not only the ratio between the air flow rates through the left and right air outlets is adjusted, but also the ratio between the air flow rate through a left portion of the central air outlet and that through a right portion thereof is changed. This provides the following disadvantages:

(1) The temperature difference between the left and right sides of the compartment tends to be large, making it difficult to finely control the temperatures at the left and right sides of the compartment; and (2) When the driver feels hot sunbeam at his right-side body portion (in the case of a vehicle with a steering wheel at the right side), if he controls the door so that the flow rate of air (cold air) blown through the right air outlet, also the flow rate of cold air blown through a right portion of the central air outlet is increased correspondingly, so that an excessive amount of cold air is blown against the right half of the driver's body, which is not good to his health.

SUMMARY OF THE INVENTION

It is therefore the object of the invention to provide an air conditioning system for automotive vehicles, which is capable of adjusting only the ratio between the air flow rates through the left and right air outlets in the compartment of the vehicle, thereby making it possible to finely adjust the temperatures at the left and right sides of the compartment according to the driver's or the passenger's preference and hence achieving comfortable air conditioning good to the driver's or the passenger's health.

To attain the above object, the present invention provides an air conditioning system for an automotive vehicle having a compartment, the system having a central air outlet, and a pair of left and right air outlets arranged at left and right sides of the central air outlet, the central air outlet and the left and right air outlets being provided at at least one of front and rear portions of the compartment.

The air conditioning system according to the invention is characterized by an improvement comprising:

central air passage means extending from a first diverging point and leading to the central air outlet;

side air passage means extending from the first diverging point in a manner separated from the central air passage means and leading to the left and right air outlets, the side air passage means having a pair of left and right air passages extending from a second diverging point which is located at a different position from the first diverging point and leading to the left and right outlets, respectively; and flow rate ratio-adjusting means arranged at the second diverging point for adjusting the ratio between the flow rates of air delivered into the left and right air passages.

The above and other objects, features, and advantages of the invention will be more apparent from the ensuing detailed description taken in conjunction with the accompanying drawings.

BRIEF DESCRIPTION OF THE DRAWINGS

FIG. 7 is a horizontal cross-sectional view showing the system of FIGS. 5 and 6; and FIG. 8 is a somewhat diagrammatic, fragmentary, perspective view of elements of the air distributor system seen in other figures.

DETAILED DESCRIPTION

Figure 1:
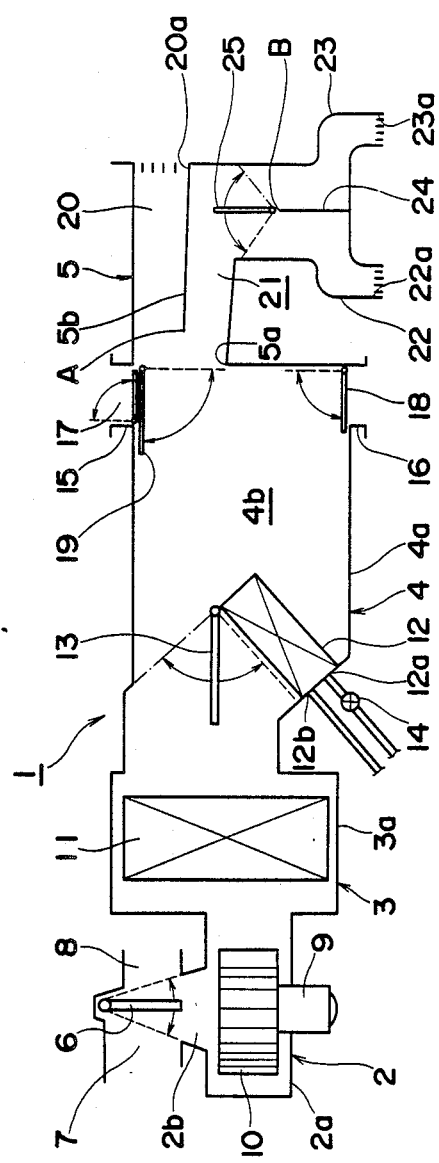
FIG. 1 is a schematic view showing the arrangement of an air conditioning system according to a first embodiment of the invention.

The invention will now be described in detail with reference to the drawings showing embodiments thereof. Corresponding elements and parts are designated by identical reference numerals throughout all the figures.

Figure 2:
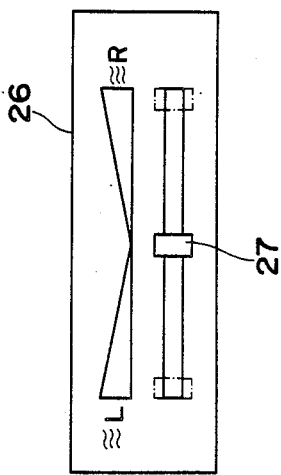
FIG. 2 is a front view showing an instrument panel in the compartment of an automotive vehicle in which the air conditioning system is installed.

Referring first to FIGS. 1 and 2, there is schematically illustrated an air conditioning system for automotive vehicles according to a first embodiment of the invention. The air conditioning system 1 is essentially comprised of a blower unit 2, a cooler unit 3, a heater unit 4, and a vent duct unit 5. The blower unit 2 has a casing 2a provided with a recirculated air inlet 7 and a fresh air inlet 8 which are selectively closed and opened by an intake door 6. Accommodated within the casing 2a is a blower fan 10 which is driven by a blower motor 9 to feed air taken in through an air intake port 2b to the cooler unit 3.

The cooler unit 3 has a casing 3a connected to the casing 2a and in which is accommodated an evaporator 11.

Connected to the casing 3a of the cooler unit 3 is a casing 4a of the heater unit 4 in which are arranged a heater core 12 and an air-mix door 13. The heater core 12 is supplied with engine cooling water as its heat source through an inlet 12a by way of a water valve 14, and from which the used water is discharged through an outlet 12b. The aforementioned air-mix door 13 is pivotally disposed to close and open a front side opening of the heater core 12. The door 13 varies in opening degree as it is pivotally displaced to adjust the mixing ratio between warm air delivered from the heater core 12 and cold air bypassing the heater core 12. Defined within the casing 4a is an air-mix chamber 4b where the cold air bypassing the heater core 12 and the warm air delivered from the heater core 12 are mixed together. The door 13 is manually operated through a temperature-adjusting lever, not shown, provided on an instrument panel 26, shown in FIG. 2, provided at a front portion of the compartment of an automotive vehicle in which the air conditioning system is installed. That is, when the temperature-adjusting lever is positioned in a maximum cooling (FUll COOL) position, an intermediate position, and a maximum heating (FULL HOT) position, respectively, the air-mix door 13 is pivotally displaced to the position indicated by the broken line, the position indicated by the solid line, and the position indicated by the chain line in FIG. 1, respectively.

A defrost duct 15 is provided at an upper wall portion of the casing 4a at a downstream side, through which mixed air of cold air and hot air, i.e. conditioned air, is blown toward the inside surface of the front window pane of the vehicle. A foot duct 16 is provided at a lower wall portion of the casing 4a at the downstream side, through which the mixed air is blown toward the feet of the driver and passenger. A defrost door 17 and a foot door 18 are provided at inlets of the respective ducts 15, 16.

The vent duct unit 5 has an inlet 5a connected to a downstream end of the casing 4a and provided with a vent door 19. Defined within the vent duct unit 5 are a center vent passage (central air passage means) 20 and a side vent passage (side air passage means) 21, which are separated from each other by a partition wall 5b. In others words, the passages 20, 21 extend from a first diverging point A in a separate fashion. A center vent (central air outlet) 20a is formed at a downstream end of the center vent passage 20 for blowing conditioned air, i.e. cold air, warm air, or mixed air thereof from a central portion of the front wall of the compartment. Defined within the side vent passage 21 are a left-hand vent passage (left air passage) 22 and a right-hand vent passage (right air passage) 23 separated from each other by a partition wall 24. A left-hand vent (left air outlet) 22a and a right-hand vent (right air outlet) 23a are formed at downstream ends of the respective passages 22, 23, for blowing conditioned air from left and right portions of the front wall of the compartment, respectively. A flow rate ratio-adjusting door 25 which is formed by a single door member is pivotally supported at its one end on an upstream end or second diverging point 24a of the partition wall 24 from which the passages 22, 23 extend in a separate fashion. As the door 25 is pivotally displaced, the opening areas of the left-hand and right-hand vent passages 22, 23 are varied to vary the ratio between the flow rates of air delivered into the passages 22, 23.

The defrost door 17, the foot door 18, and the vent door 19 are all manually operated by means of a mode-selecting lever, not shown, provided on the instrument panel 26.

The flow rate ratio-adjusting lever 25 is manually operated by a left and right flow rate-adjusting lever 27 also provided on the instrument panel 26. More specifically, if the lever 27 is set to a middle position as indicated by the solid line in FIG. 2, the door 25 assumes a position as indicated by the solid line in FIG. 1. As the lever 27 is moved from the middle position toward a leftmost position L (left side maximum flow rate position) indicated by the chain line in FIG. 2, the door 25 is pivotally moved from the position indicated by the solid line in FIG. 1 toward a position indicated by the chain line in FIG. 1. If the lever 27 is moved from the middle position toward a rightmost position R (right side maximum flow rate position) indicated by the broken line in FIG. 2, the door 25 is pivotally moved from the position indicated by the solid line in FIG. 1 toward a position indicated by the broken line in FIG. 1.

The operation of the air conditioning system 1 constructed as above is as follows:

When the blower fan 10 is rotatively driven by the blower motor 9, recirculated air from the interior of the compartment or fresh air selected by the intake door 6 is drawn through the air intake port 2b into the casing 2a of the blower unit 2. The air thus drawn into the casing 2a is then cooled by the evaporator 11 into cold air and delivered into the casing 4a of the heater unit 4. If on this occasion the air-mix door 13 assumes the position (FULL COOL position) indicated by the broken line in FIG. 1, all the cold air bypasses the heater core 12, while if the door 13 assumes the position (FULL HOT position), all the cold air is delivered to the heater core 12 and heated thereby into warm air. If the air-mix door 13 assumes an intermediate position between the position indicated by the broken line in FIG. 1 and that indicated by the chain line in FIG. 1, the cold air directly supplied from the evaporator 11 and the warm air supplied from the heater core 12 are mixed together in the air-mix chamber 4b in a ratio corresponding to the angular position of the air-mix door 13, and the resulting mixed air is then delivered toward the downstream side.

If the mode-selecting lever, not shown, is set to a vent mode position (in which position the vent door 19 alone is open), or to a bi-level mode position (in which position the foot door 18 and the vent door 19 are both open), and at the same time the temperature-adjusting lever is set to a cooling position, cold air having a temperature corresponding to the set position of the temperature-adjusting lever is delivered into the vent duct unit 5 through the vent door 19. The cold air is then divided into two parts, one flowing in the center vent passage 20 and the other flowing in the side vent passage 21. The air flowing in the center vent passage 20 is blown through the center vent 20a into a front central portion of the compartment. The air flowing in the side vent passage 21 is further divided into two parts, one flowing in the left-hand vent passage 22 and the other flowing in the right-hand vent passage 23 in a ratio corresponding to the angular position of the flow rate ratio-adjusting door 25.

If it is desired that cold air should be blown through the left-hand and right-hand vents 22a, 23a in equal amounts in the case that the assistant driver's seat is occupied, the left and right flow rate-adjusting lever 27 should be set to the middle position indicated by the solid line in FIG. 2. With the lever 27 set in this middle position, the flow rate ratio-adjusting door 25 assumes a neutral or intermediate position indicated by the solid line in FIG. 1, the cold air from the air-mix chamber 4b is divided into the left-hand and right-hand vent passages 22, 23 in equal amounts so that air is blown through the left-hand and right-hand vents 22a, 23a into front left side and front right side portions of the compartment in equal amounts.

With the left and right flow rate-adjusting lever 27 thus set in the middle position, if the driver feels hot sunbeam at the right half of his body (in the case of a vehicle with a right-hand steering wheel), the lever 27 should be moved from the middle position toward the position R indicated by the chain line in FIG. 2. Accordingly, the flow rate ratio-adjusting door 25 is moved from the neutral position indicated by the solid line in FIG. 1 toward the position indicated by the broken line in FIG. 1 so that the flow rate of cold air flowing into the right-hand vent passage 23 becomes larger than that flowing into the left-hand passage 22. The flow rate of cold air blown through the right-hand vent 23a hence becomes larger than that blown through the left-hand vent 22a whereby the right half of the driver's body exposed to the sunbeam is cooled to a larger extent. On this occasion, the cold air flowing in the center vent passage 20 is blown from the front central portion of the front wall of the compartment without parts of the cold air flowing to left and right portions of the center vent 20a being adjusted in flow rate. Therefore, the left half of the driver's body not exposed to the sunbeam will not be cooled to an excessive extent.

Conversely, if the passenger sitting on the assistant driver's seat feels hot sunbeam at the left half of his body, the left and right flow rate-adjusting lever 27 should be moved from the middle position toward the position L indicated by the chain line in FIG. 2, the flow rate of cold air blown through the left-hand vent 22a becomes larger than that through the right-hand vent 23a.

In this way, by varying the position of the left and right flow rate-adjusting lever 27, the flow rates of conditioned air such as cold air blown through the left-hand and right-hand vents 22a, 23a can be adjusted in an easy and simple manner at the desire of the driver or the passenger. Thus, comfortable air conditioning within the compartment can be achieved.

Figure 3:
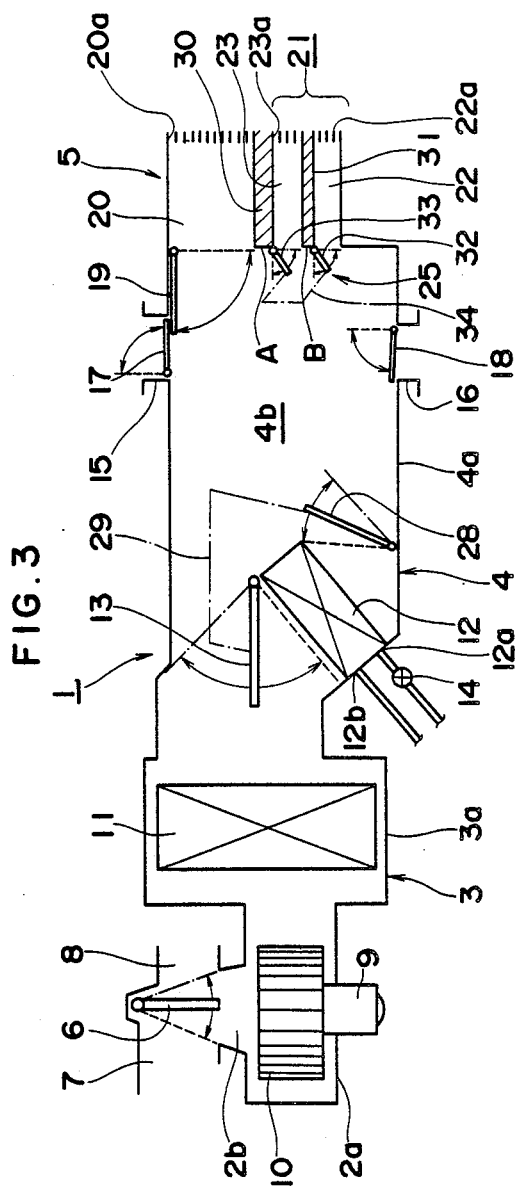
FIG. 3 is a similar view to FIG. 1, showing a second embodiment of the invention.
Figure 4:
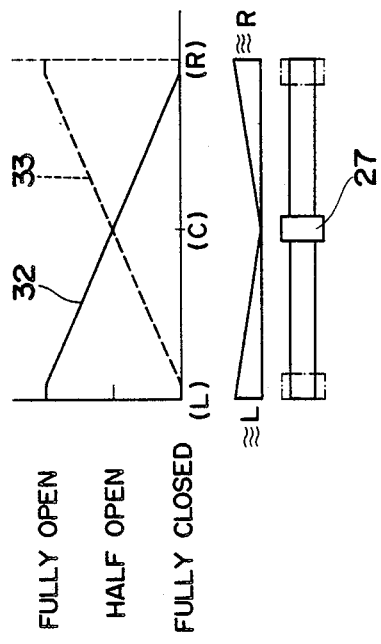
FIG. 4 is a view useful in explaining the operation of two air flow rate-adjusting doors.

FIGS. 3 and 4 show a second embodiment of the invention.

As shown in FIG. 3, an auxiliary door 28 is arranged behind a heater core 12 of a heater unit 4 for closing and opening a rear side opening thereof. The auxiliary door 28 is connected to an air-mix door 13 by means of link means 29 to be pivotally moved in response to pivotal movement of the air-mix door 13 so that the door 28 closes the rear side opening of the heater core 12, respectively, when the door 13 closes and opens a front side opening of the heater core 12.

A vent duct unit 5 has defined therein a center vent passage 20 and a side vent passage 21 which are separated from each other by a partition wall 30, an upstream end of which forms a first diverging point A. In this embodiment, the first and second diverging points A, B are located in the same position in the air flowing direction. The side vent passage 21 is further divided into left-hand and right-hand vent passages 22 and 23 by a partition wall 31, an upstream end of which forms a second diverging point B. Upstream ends or inlets of the center vent passage 20, the left-hand vent passage 22, and the right-hand vent passage 23 are connected to a downstream end of an air-mix chamber 4b defined within a casing 4a of the heater unit 4.

A vent door 19 is arranged at the inlet of the center vent passage 20 and operated by a mode-selecting lever, not shown, to close and open the inlet of the passage 20. On the other hand, flow rate ratio-adjusting doors 32, 33 formed by two door members are provided at the second diverging point B, namely at respective upstream ends of the left-hand and right-hand vent passages 22, 23 and are connected to each other by means of an interlocking mechanism 34.

The flow rate ratio-adjusting doors 32, 33 are connected to the mode-selecting lever and a left and right flow rate-adjusting lever 27 via the interlocking mechanism 34 in such a manner that when the mode-selecting lever is set to a defrost mode position, they both assume fully closed positions where the left-hand and right-hand vent passages 22, 23 are both closed, and when the mode-selecting lever is set to a vent mode position or to a bi-level mode position, they are pivotally moved as the left and right flow rate-adjusting lever 27 is moved to selectively close and open the respective vent passages 22, 23 in a manner shown in FIG. 4.

More specifically, as shown in FIG. 4, when the mode-selecting lever is set to the vent mode position or to the bi-level mode position, if the left and right flow rate-adjusting lever 27 is moved from a leftmost position L in FIG. 4 to a rightmost position R through a middle position C at which the flow rate ratio-adjusting doors 32, 33 assume positions indicated by the solid lines in FIG. 3, the door 32 is pivotally moved from a fully open position to a fully closed position through a half open position, as indicated by the solid line in FIG. 4, while the door 33 is pivotally moved from a fully closed position to a fully open position through a half open position, as indicated by the broken line in FIG. 4.

The flow rate ratio-adjusting levers 32, 33 and the interlocking mechanism 34 cooperatively form flow rate ratio-adjusting means 25.

Except for the arrangement and construction described above, the second embodiment is substantially identical in arrangement and construction with the first embodiment described with reference to FIGS. 1 and 2.

Reference is now made to the operation of the FIG. 3 arrangement which is peculiar to the second embodiment:

When the mode-selecting lever is set to the vent mode position or to the bi-level mode position, if the left and right flow rate-adjusting lever 27 is set to the position C, the flow rate ratio-adjusting levers 32, 33 both assume half open positions whereby equal amounts of conditioned air, e.g. cold air, flow into the left-hand and right-hand vent passages 22, 23, and blown through left-hand and right-hand vents 22a, 23a into front left-hand and right-hand portions of the compartment, respectively.

Then, if the left and right flow rate-adjusting lever 27 is moved from the position C toward the position R, the flow rate ratio-adjusting lever 33 is pivotally moved toward the fully open position, and the flow rate ratio-adjusting lever 32 toward the fully closed position, respectively. As a result, the flow rate of cold air flowing into the right-hand vent passage 23 becomes larger than that flowing into the left-hand vent passage 22 so that the flow rate of cold air blown through the right-hand vent 23a becomes larger than that blown through the left-hand vent 22a whereby the right half of the driver's body is cooled to a larger extent. On this occasion, the cold air flowing in the center vent passage 20 is blown from the central portion of the front wall of the compartment without parts of the cold air flowing to left and right portions of the center vent 20a being adjusted in flow rate. Therefore, the left half of the driver's body not exposed to the sunbeam will not be cooled to an excessive extent.

Conversely, if the left and right flow rate-adjusting lever 27 is moved toward the position L, the flow rate ratio-adjusting door 32 is pivotally moved toward the fully open position, and the flow rate ratio-adjusting door 33 toward the fully closed position, respectively, so that the flow rate of cold air blown through the left-hand vent 22a becomes larger than that blown through the right-hand vent 23a, thereby cooling the left half of the body of the passenger on the assistant driver's seat to a larger extent.

Figure 5:
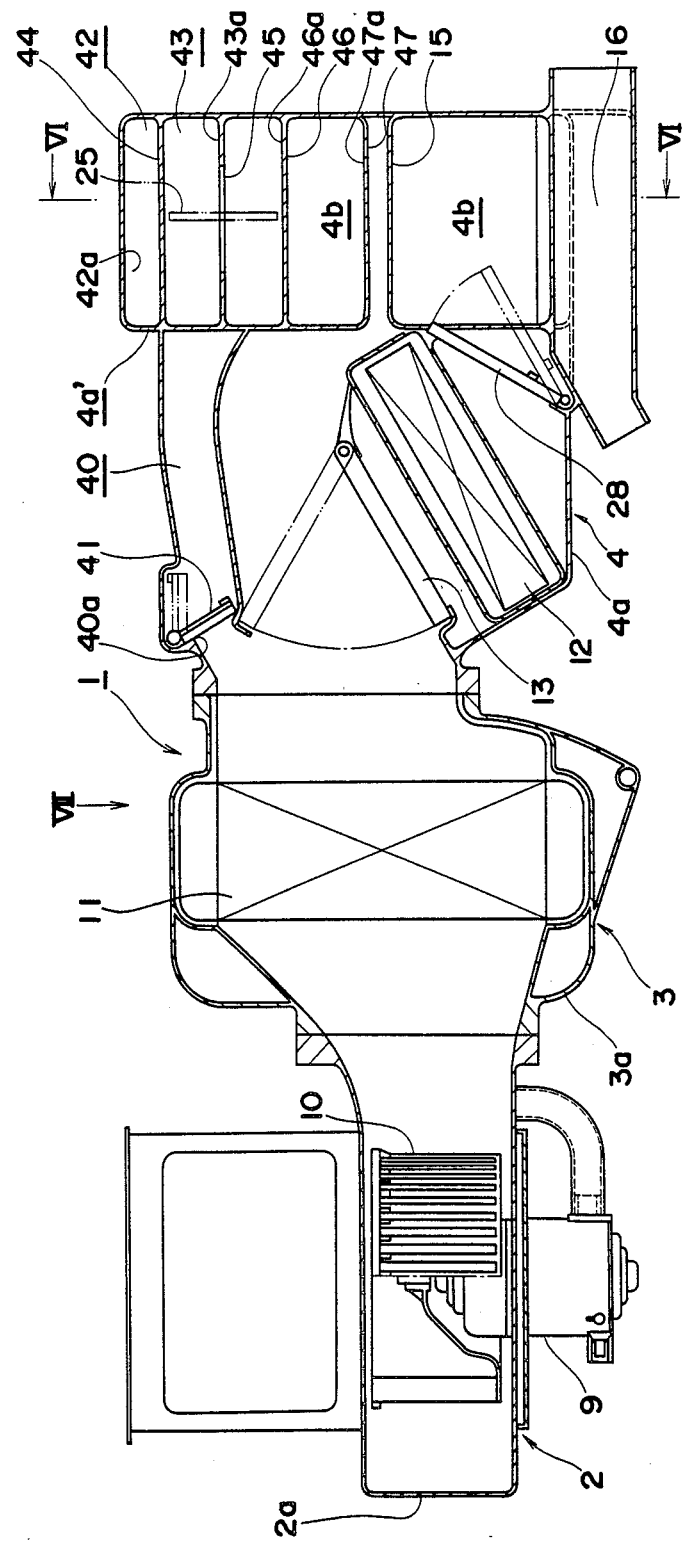
FIG. 5 is a vertical longitudinal cross-sectional view showing the arrangement of an air conditioning system according to a third embodiment of the invention.
Figure 6:
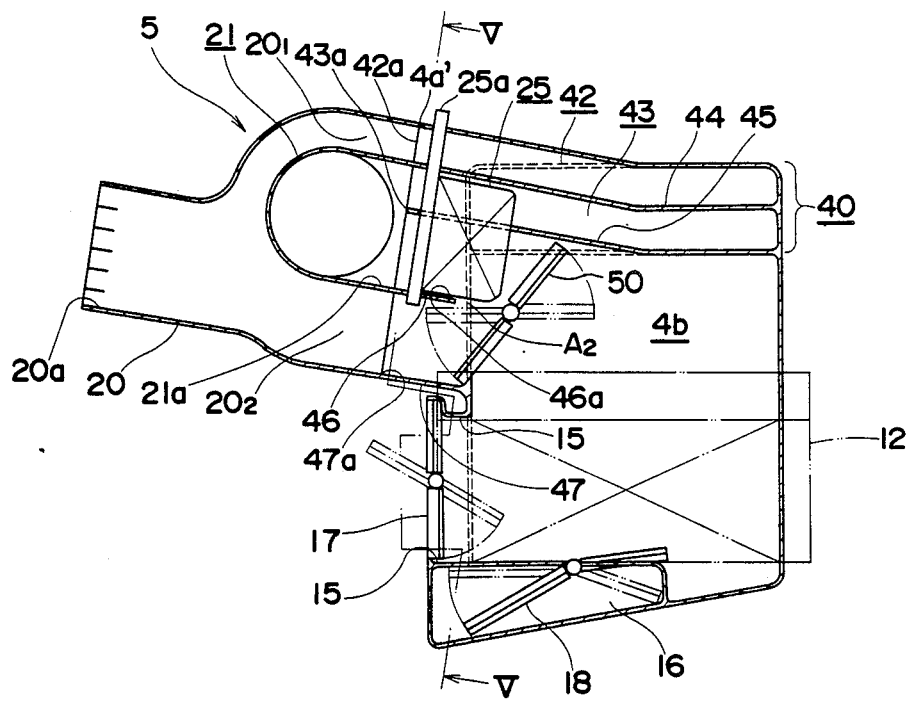
FIG. 6 is a cross-sectional view taken along line VI—VI in FIG. 5.

FIGS. 5 through 7 show a third embodiment of the invention.

The third embodiment is an application of the invention to an air conditioning system having a cold air-bypass passage which is provided in order that the temperature of conditioned air blown toward the driver's or the passenger's face through a center vent 20a, and left-hand and right-hand vents 22a, 23a is controlled to a lower value than the temperature of conditioned air blown toward the driver's or the passenger's feet, to achieve comfortable air conditioning wherein the driver's or the passenger's heads are cooled, and their feet are warmed.

Referring to FIG. 5, a cold air-bypass passage 40 is formed in a casing 4a of a heater unit 4 and extends along an upper inner wall in a fashion bypassing a heater unit 12 and an air-mix chamber (mixed air-delivering means) 4b, for guiding cold air from an evaporator 11 toward a downstream side thereof. Provided at an inlet 40a of the cold air-bypass passage 40 is a cold air passage door 41 for closing and opening the inlet 40a. This cold air passage door 41 may be manually operated through a cold air flow rate-adjusting lever, not shown, for example.

As best shown in FIG 8, a partition wall 44, whose upstream end forms a first diverging point $A_1$, is formed in a downstream end portion of the casing 4a, which extends to a downstream end 4a' of the casing 4a and divides a downstream portion of the cold air-bypass passage 40 into a first cold air-bypass passage 42 and a second cold air-bypass passage 43. Another partition wall 45 is also formed in the downstream end portion of the casing 4a and extends to the downstream end 4a' of the casing 4a, in a fashion separating the second cold air-bypass passage 43 and the air-mix chamber 4b from each other. The partition wall 45 has an arcuate cut-out portion so that a flow rate ratio-adjusting door 25, hereinafter referred to, arranged at the cut-out portion is able to pivotally move. The first cold air-bypass passage 42 has a downstream open end 42a serving as an upper outlet for delivering air to a center vent 20a, while the second cold air-bypass passage 43 defined by the partition wall 44 and the partition wall 45 has a downstream open end 43a serving as an upper outlet for delivering air to side vents 22a, 23a. A partition wall 46 and a lower wall 47 are provided at a downstream end portion of the casing 4a in such a manner that a lower outlet 46a for delivering air to the side vents 22a, 23a is defined by end portions of the partition wall 46 and the partition wall 45, and a lower outlet 47a for delivering air to the center vent 20a by end portions of the partition wall 46 and the lower wall 47, respectively. The partition wall 46 has its upstream end forming a first diverging point $A_2$ A defrost duct 15 and a foot duct 16 are provided at lower parts of the downstream end portion of the casing 4a, which are provided with a defrost door 17 and a foot door 18, respectively.

As shown in FIGS. 6 and 7, a vent duct unit 5 is mounted on the downstream end portion 4a' of the casing 4a, which has defined therein a center vent upper passage $20_1$ communicating with the open end 42a of the first cold air-bypass passage 42, and a center vent lower passage $20_2$ communicating with the center vent lower outlet 47a. The two passages $20_1$, $20_2$ join at their downstream ends and lead to the center vent 20a. On the other hand, a side vent passage 21 defined within the vent duct unit 5 is comprised of a central passage 21a defined between the center vent upper and lower passages $20_1$, $20_2$ and communicating with the side vent upper outlet 43a of the second cold air-bypass passage 43 and the side vent lower outlet 46a, and left-hand and right-hand side vent passages 22 and 23 extending in respective leftward and rightward directions from the central passage 21a. The two side vent passages 22, 23 are separated from each other by a partition wall 24 provided in the central passage 21a and an upstream end of which forms a second diverging point B. The flow rate ratio-adjusting door 25 formed by a single door member is arranged in a passage defined between the partition walls 44, 46 at the downstream end of the casing 4a for pivotal movement about a fulcrum shaft 25a thereof for adjusting the ratio between the flow rates of cold air from the second cold air bypass passage 43 and conditioned air from the air-mix chamber 4b into the left-hand and right-hand side vent passages 22, 23.

In FIG. 6, reference numeral 50 denotes a vent door for closing and opening the side vent lower outlet 46a and the center outlet 47a.

The peculiar operation of the third embodiment constructed as above will now be explained:

If it is desired to effect air conditioning in the bi-level mode in such a manner that cold air is blown toward the driver's or the passenger's head and warm air toward his feet, respectively, the cold air door 41 is opened to introduce cold air in an amount corresponding to the angular position thereof into the cold air-bypass passage 40. At the same time, the vent door 50 and the foot door 18 are opened. The cold air through the open door 41 then flows in the cold air-bypass passage 40 while bypassing the heater core 12 and the air-mix chamber 4b into the first and second cold air-bypass passages 42, 43. The cold air flowing into the first cold air-bypass passage 42 is then guided into the center vent upper passage $20_1$ of the center vent passage 20, and the cold air flowing into the second cold air-bypass passage 43 into the central passage 21a of the side vent passage 21, respectively. On this occasion, the air-mix chamber 4b has a downstream zone thereof supplied with conditioned air of cold air and warm air mixed in a ratio corresponding to the angular positions or opening degrees of the air-mix door 13 and an auxiliary door 28. Part of the conditioned air is delivered into the central passage 21a of the side vent passage 21 through the side vent lower outlet 46a, another part of the conditioned air into the center vent lower passage $20_2$ of the center vent passage 20 through the center vent lower outlet 47a, and the remaining part of the conditioned air into the foot duct 16 to be blown toward the driver's or the passenger's feet, respectively.

The cold air flowing into the center vent upper passage $20_1$ and the conditioned air flowing into the center vent lower passage $20_2$ are joined and mixed together at the downstream ends of the passages $20_1$, $20_2$ into a warm air having a lower temperature than the conditioned air to be blown toward the driver's or the passenger's face through the center vent 20a of the center vent passage 20. On the other hand, the cold air and the conditioned air flowing into the central passage 21a of the side vent passage 21 are mixed together into a warm air having a temperature than the conditioned air to be guided in the left-hand and right-hand vent passages 22, 23 and blown through the left-hand and right-hand vents 22a, 23a into the compartment. As stated above, the conditioned air blown from the center vent 20a and the left-hand and right-hand vents 22a, 23a is lower in temperature than the conditioned air blown through the foot duct 16 toward the driver's or the passenger's feet.

If it is desired to adjust the flow rates of air blown through the left-hand and right-hand vents 22a, 23a while the mode-selecting lever is set to the bi-level mode position or to the vent mode position, the flow rate ratio-adjusting door 25 should be pivotally moved like the preceding embodiments.

Although in the embodiments described above the flow rate ratio-adjusting lever or means 25 is manually operated, it may be automatically controlled in response to output from a pyrheliometer or the like.

Although in the embodiments described above the flow rate ratio between air blown through the left-hand and right-hand vents 22a, 23a which are provided on the front side of the compartment is adjustable, this is not limitative, but it may be designed such that the flow rate ratio between air blown through left-hand and right-hand vents which are provided on the rear side of the compartment is adjustable by means of similar arrangements employed in the embodiments.

What is claimed is:

1. In an air conditioning system for an automotive vehicle having a compartment, the system having a central air outlet, and left and right air outlets respectively arranged at left and right sides of said central air outlet, said central air outlet and said left and right air outlets being provided at at least one of front and rear portions of said compartment, the improvement comprising;
   central air passage means extending from a first diverging point and leading to said central air outlet;
   side air passage means extending from said first diverging point in a manner separated from said central air passage means and leading to said left and right air outlets, said side air passage means having left and right air passages extending from a second diverging point which is located at a different position from said first diverging point and leading to said left and right outlets, respectively;
   said first diverging point dividing air into a first part delivered into said central air passage means and a second part delivered into said side air passage means at a substantially fixed ratio;
   a single flow rate ratio-adjusting means arranged at said second diverging point for adjusting the ratio between the respective flow rates of air delivered into said left and right air passages;
   said second diverging point being located at a position downstream of said first diverging point in a direction in which air flows, said side air passage means having a common passage extending from said first diverging point to said second diverging point and being separated from said central air passage means;
   heater means arranged upstream of said central air passage means and said side air passage means in a direction in which air flows;
   mixed air-delivering means arranged between said heater means and said central air passage means and said side air passage means for delivering mixed air of cold air and warm air to the latter;
   cold air-bypass passage means bypassing cold air flowing upstream of said heater means and said mixed air-delivering means around said heater means and said mixed air-delivering means, said cold air-bypass passage means having a first cold air-bypass passage leading to said central air passage means and a second cold air-bypass passage leading to said side air passage means;
   a foot air outlet; and
   passage means connecting between said foot air outlet and said mixed air-delivering means.

* * * * *